Figure 1:
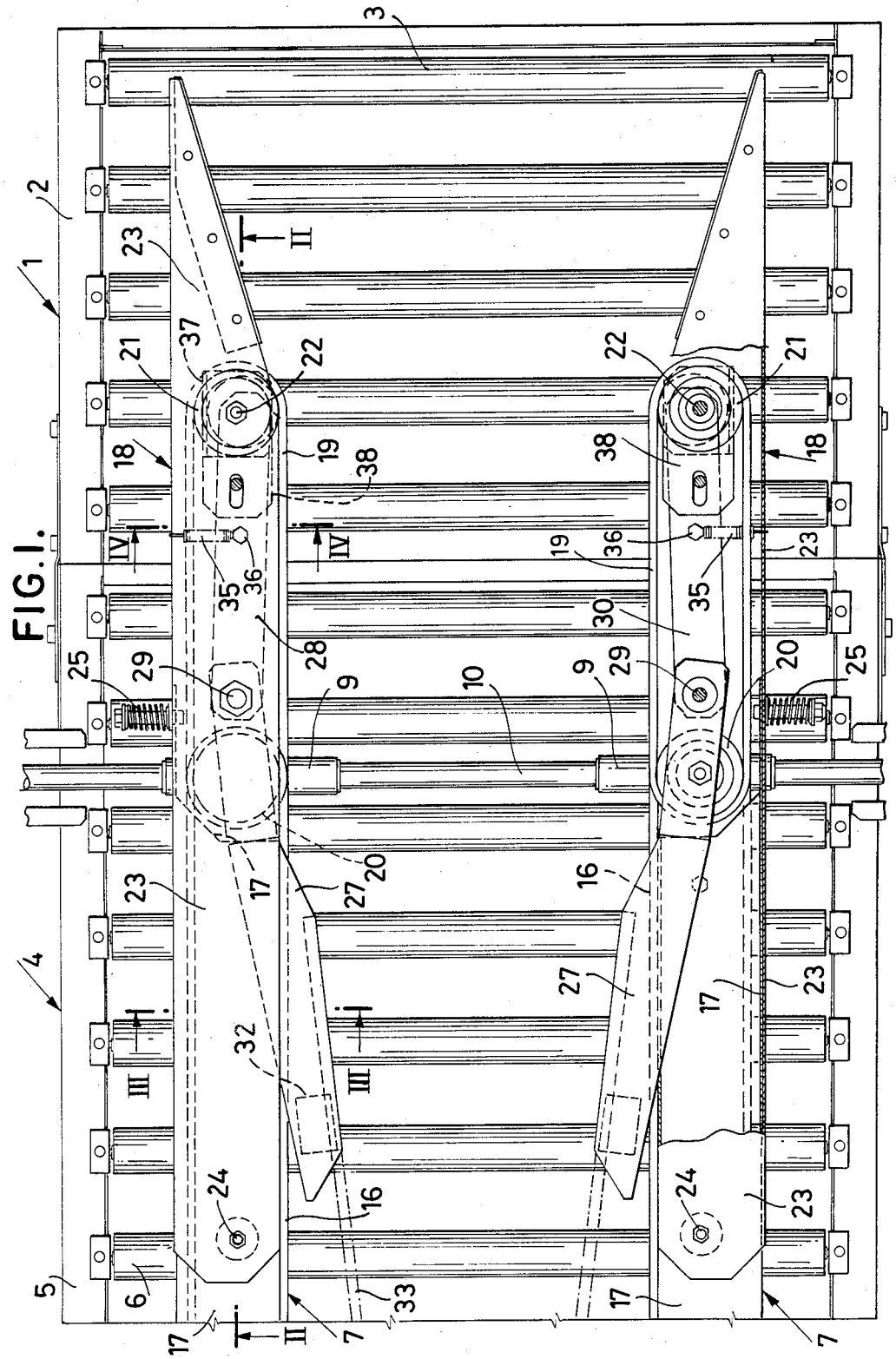

United States Patent [19]

Marchetti

[11] Patent Number: 4,735,302
[45] Date of Patent: Apr. 5, 1988

[54] SPACING DEVICE FOR OBJECTS CONVEYED THROUGH AN OPERATING MACHINE, IN PARTICULAR FOR CARDBOARD BOX CLOSING/AND OR SEALING MACHINES

[76] Inventor: Augusto Machetti, Piazza Sicilia, 7-20146 Milano, Italy

[21] Appl. No.: 917,595

[22] Filed: Oct. 9, 1986

[30] Foreign Application Priority Data

Oct. 15, 1985 [IT] Italy .................... 22492 A/85

[51] Int. Cl.$^4$ .............................. B65G 47/26
[52] U.S. Cl. ............................ 198/463.4; 198/628
[58] Field of Search ............ 198/463.4, 463.6, 627, 198/628

[56] References Cited

U.S. PATENT DOCUMENTS

| | | | |
|---|---|---|---|
| 1,508,369 | 9/1924 | Johnson | 198/463.6 |
| 1,613,552 | 1/1927 | Armstrong | 198/463.4 |
| 2,316,654 | 4/1943 | Stover | 198/627 X |
| 3,231,063 | 1/1966 | Talbot | 198/627 X |
| 3,327,835 | 6/1967 | Wunsche | 198/463.6 X |
| 4,161,138 | 7/1979 | Marchetti | 198/627 X |
| 4,262,468 | 4/1981 | Marchetti | 198/460 X |
| 4,361,221 | 11/1982 | Michal | 198/463.6 X |
| 4,543,150 | 9/1985 | Marchetti | 198/627 X |

Primary Examiner—Robert J. Spar
Assistant Examiner—D. Glenn Dayoan
Attorney, Agent, or Firm—Cushman, Darby & Cushman

[57] ABSTRACT

In a machine for handling objects conveyed through the machine, there is a spacing device for the objects which includes at least one lever pivoted on a spreading section of an entrainment unit. The lever is elastically stressed in a position such that a first portion thereof is normally moved toward the interior of the machine and inserted in the path of travel of the objects while a second portion thereof bearing a passive stopping device and located upstream from the first is normally moved toward the exterior of the machine and outside the path of travel of the objects. When a first object meets the first portion of the lever moving it outwardly, the second portion of the lever is moved inwardly in such a manner that the stopping device can prevent advance of a second object until the first object reaches a desired distance.

7 Claims, 6 Drawing Sheets

SPACING DEVICE FOR OBJECTS CONVEYED THROUGH AN OPERATING MACHINE, IN PARTICULAR FOR CARDBOARD BOX CLOSING/AND OR SEALING MACHINES

The present invention relates to a device for spacing objects conveyed through an operating machine, in particular for cardboard box closing and/or sealing machines.

Various operating machines are known which comprise a surface for supporting and advancing objects conveyed and operating means located along said surface to process said objects when said objects pass through a predetermined operating zone of the machine.

Machines of this type are for example known machines for closing and/or sealing cardboard boxes which provide as conventional operating means appropriate closing members for folding upper flaps and/or upper and lower taping units.

It is also known that in said operating machines it is important that the objects conveyed pass through the operating zone of the machine sufficiently spaced one from the other to allow the various operating means to process one object at a time without interference from the preceding and following objects.

In particular this is the case of the upper flap-closing members of the abovementioned closing machines which require space to perform appropriate closing of the flaps which they engage.

It is fairly frequent that the objects reach the operating machine close together and thus require adequate spacing.

There has already been proposed by this applicant and described in U.S. Pat No. 4,262,468 a device which makes it possible to bring about automatically appropriate spacing of the objects before the entry thereof into the operating zone of the machine.

Said device comprises essentially a pair of retaining members of the active type consisting of transversal pushers operated by compressed air which means sensitive to the passage of a first member cause tomove from a mutually withdrawn position to a mutually approached position in which said pushers can prevent advancement of a second object until the first object has reached a desired distance.

This known device operates in a correct manner but has the drawback of requiring active retaining members which call for a compressed air drive and consequently compressed air connections with the resulting construction and functional complications.

The object of the present invention is to accomplish an automatic spacing device which would achieve the same results as the known device with simpler means, in particular without requiring a power supply of any type whatsoever for the retaining operation.

In accordance with the invention said object is achieved by means of a device comprising means sensitive to the passage of a first object and at least one retaining member placed upstream from said sensitive means in the direction of travel of the objects and caused by said sensitive means to move transversely to said direction of travel to create a retaining engagement with a second object until the first object reaches a desired distance characterized in that said sensitive means consist of a first portion of a lever pivoted on a spreadable section of a belt entrainment unit engageable at the sides with the objects conveyed to advance them through the machine and in that said retaining member consists of a passive stop mounted on a second portion of said lever in such a manner as to be moved toward the interior of the machine when said first portion is moved outward by the passage of a first object and vice versa there being provided first elastic means acting on said spreadable section of said entrainment unit to stress it in a yielding manner toward alignment with the remaining part of said unit and second elastic means acting on said lever to stress it in a yielding manner into a waiting position in which said first part is moved toward the interior of the machine and said second part is moved toward the exterior of said machine.

The device in accordance with the invention therefore does not require the use of retaining members of the active type but of the passive type, i.e. members which do not need a driving power supply but merely utilize for their operation the mechanical action exerted on the lever or levers which support them by the passage of the objects adjacent to the sensing portion of said lever or levers. Construction is thus considerably simplified as is operation. Automatic spacing of the objects is also fully assured.

Figure 2:
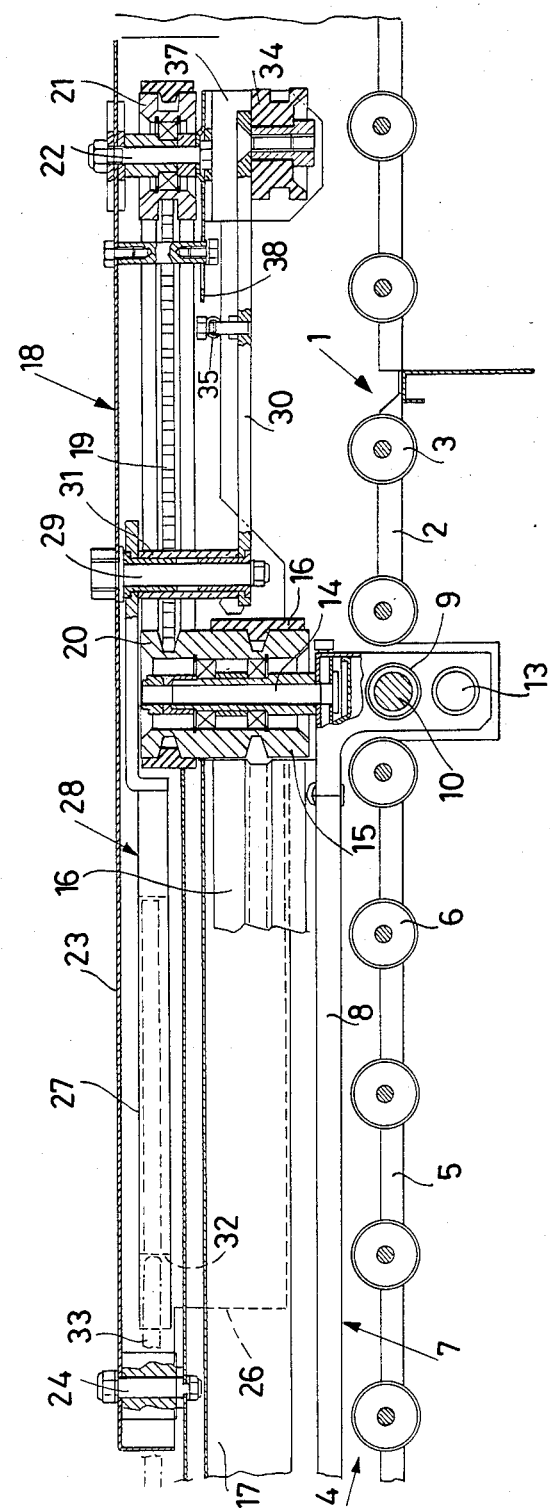
Figure 3:
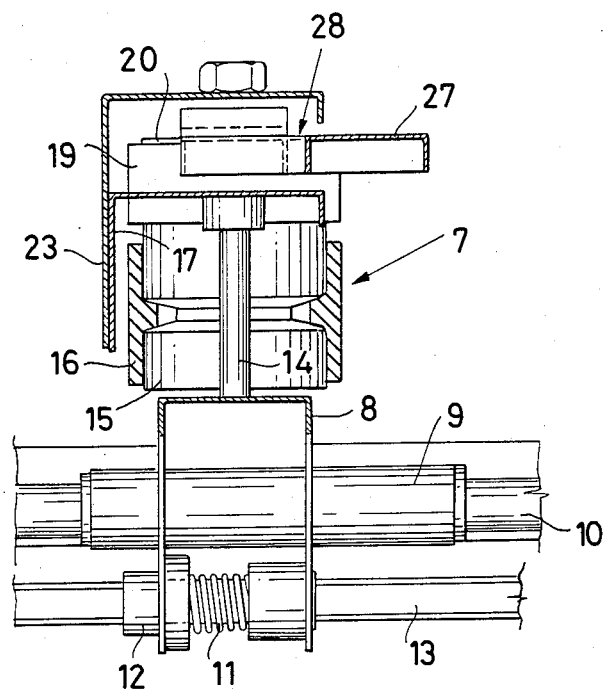
Figure 4:
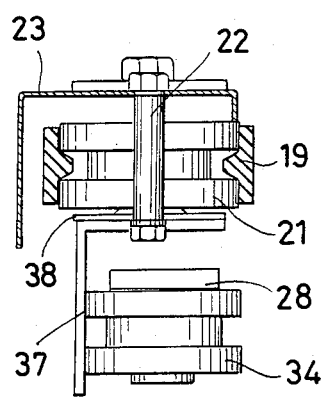

These and other characteristics of the present invention will be made clear by the following detailed description of a practical embodiment thereof illustrated as an example in the annexed drawings wherein FIG. 1 shows a plan view with sections of a spacing device in accordance with the invention applied to a machine for closing cardboad boxes, FIG. 2 shows a cross section of said device along line II—II of FIG. 1, FIG. 3 shows a cross section of said device along line III—III of FIG. 1, FIG. 4 shows a cross section of said device along line IV—IV of FIG. 1, and FIGS. 5-7 show plan views of said device in operation.

In the drawings reference number 1 shows generally a support and travel surface for cardboard boxes which is made up of a frame 2 and parallel idling rollers 3 and forms an extension to a similar support and travel surface 4 of a machine known in itself for closing the upper flaps of cardboard boxes. The surface 4 is in turn formed of a frame 5 and parallel idling rollers 6.

The closing machine provides in a known manner for travel of the box a pair of belt entrainment units 7 arranged parallel to and along the corresponding sides of the surface and mutually approachable and separable for the purpose of regulation on the basis of the width of the boxes.

More precisely each entrainment unit 7 comprises a support 8 which extends from one end to the other of the machine where it is supported in a running manner by appropriate cross bars such as the one indicated with reference number 10 in FIGS. 1-3 through sleeves 9. At the inlet end of the machine the support 8 is also stressed in a yielding manner by a spring 11 (FIG. 3) against a female screw in engagement with an adjusting screw 13 parallel to the bar 10 and which can be made to rotate by a crank not illustrated. The adjusting screw 13 is in reality equipped with two threaded portions with differing progression on which are engaged the female screws of the entrainment units 7 in such a manner that said rotation of the screw 13 causes differing movements of the two units for mutual approach and separation. This adjustment system is well known and has been described in U.S. Pat. No. 4,543,150 of this applicant.

On the support 8 of each entrainment unit 7 at the two ends of said support are mounted in a turning manner by means of shafts 14 two end pulleys 15 between which extends in a closed loop an entrainment belt 16 protected above and on the outer side by a hood 17 (FIG. 3). As may be seen from FIG. 2 the pulley 15 located at the inlet end of the machine is mounted in an idling manner on the shaft 14 and can therefore turn freely. The pulley located at the outlet end is made integral with its shaft 14 which in turn is connected with a motorization system of any known type. Suitable motorization systems are described in U.S. Pat. Nos. 4,543,150 and 4,161,138 of this applicant.

As shown in FIGS. 1 and 2 the inlet ends of the two entrainment units 7 are fitted with extensions 18 which develop along the supporting surface 1 and make up part of the spacing device in accordance with the invention. Each of said extensions comprises a belt 19 extending in a closed loop between a pulley 20 made in a single piece with the inlet pulley 15 shown in FIG. 2 and a pulley 21 mounted in a freely turning manner on a shaft 22 born by an idling pulley 38 from the inlet of a second hood 23 (FIGS. 2 and 3) which also extends on the aforementioned hood 17 until it is pivoted thereon by a pin 24 (FIGS. 1 and 2). A spring 25 stresses the upper hood 23 into alignment with the lower hood 17, utilizing for this purpose an appropriate striker engagement between a lower extension 26 of the side wall of the hood 23 and the side wall of the hood 17 (FIGS. 2 and 3).

Inside the hood 23 in the part overlying the hood 17 there develops a first portion 27 of a lever 28 which is pivoted on the upper wall of the hood 23 through a pin 29 (FIGS. 1 and 2) and has a second portion 30 (upstream from the first portion in the direction of travel of the boxes) which develops beneath the belt 19 forming an angle with the first portion 27 (FIG. 1) and is made integral with the latter by a sleeve 31 mounted in a turning manner around a pin 29 (FIG. 2). The first portion 27 is fitted with a seat 32 for housing an optional extension bar 33. The second portion 30 bears in a turning manner an idling roller 34 optionally replaceable by a fixed shoe.

Figure 5:
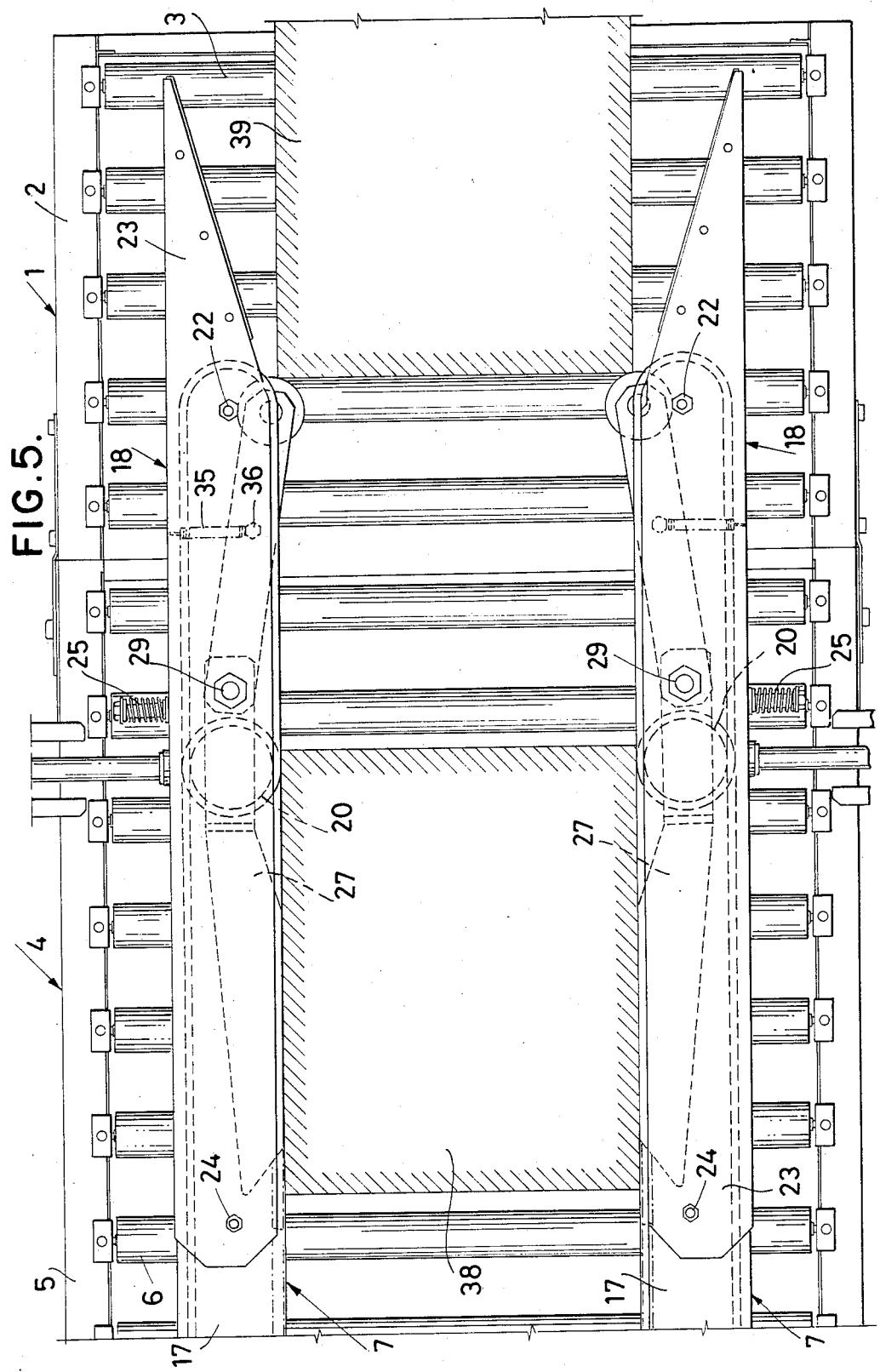

A spring 35 reacts between the hood 23 and a pin 36 fixed to the portion 30 of the lever 28 (FIGS. 1 and 2) to stress the lever 28 into the waiting or rest position illustrated in FIG. 1 in which the first portion 27 and the optional extension bar 33 protrude from the hood 23 toward the interior of the machine, i.e. in the path of travel of the boxes, while the second portion 30 and in particular the idling roller 34 are within the space occupied by the hood 23 and outside the path of travel of the boxes, this position being set by the striker engagement of the roller 34 with the stop plate 37 fixed to the pin 22. Thanks to the mutual angle of the two lever portions 27 and 30 the second portion 30 and the related idling roller 34 are forced to emerge from the hood 23 toward the interior of the machine, i.e. into the path of travel of the boxes, in case of forced return of the first portion 27 within the space occupied by the hood 23 and outside the path of travel of the boxes as shown in FIG. 5.

Consequently the spacing device illustrated in the drawings is designed to operate as follows. With the device in the waiting position of FIG. 1 a first box 38 fed onto the supporting surface 1 and subsequently advanced by the belts 19 and 16 meets the downstream portions 27 of the levers 28 (FIG. 5) causing it to return within the space occupied by the hood 23 and hence, due to the rotating effect of the levers 28, causing mutual approach of the rollers 34.

If a second box 39 is not yet inserted between the two belts 19 and hence has not yet reached the area of operation of the rollers 34 said rollers 34 are free to approach each other as far as allowed by the lever arms of the portions 30 in relation to the pins 29 so that a frontal obstacle is formed for the second box 39 which however can be brought to butt against the roller 34 (FIG. 5) without being able to proceed further until release of the downstream portions 27 by the first box 38.

Figure 6:
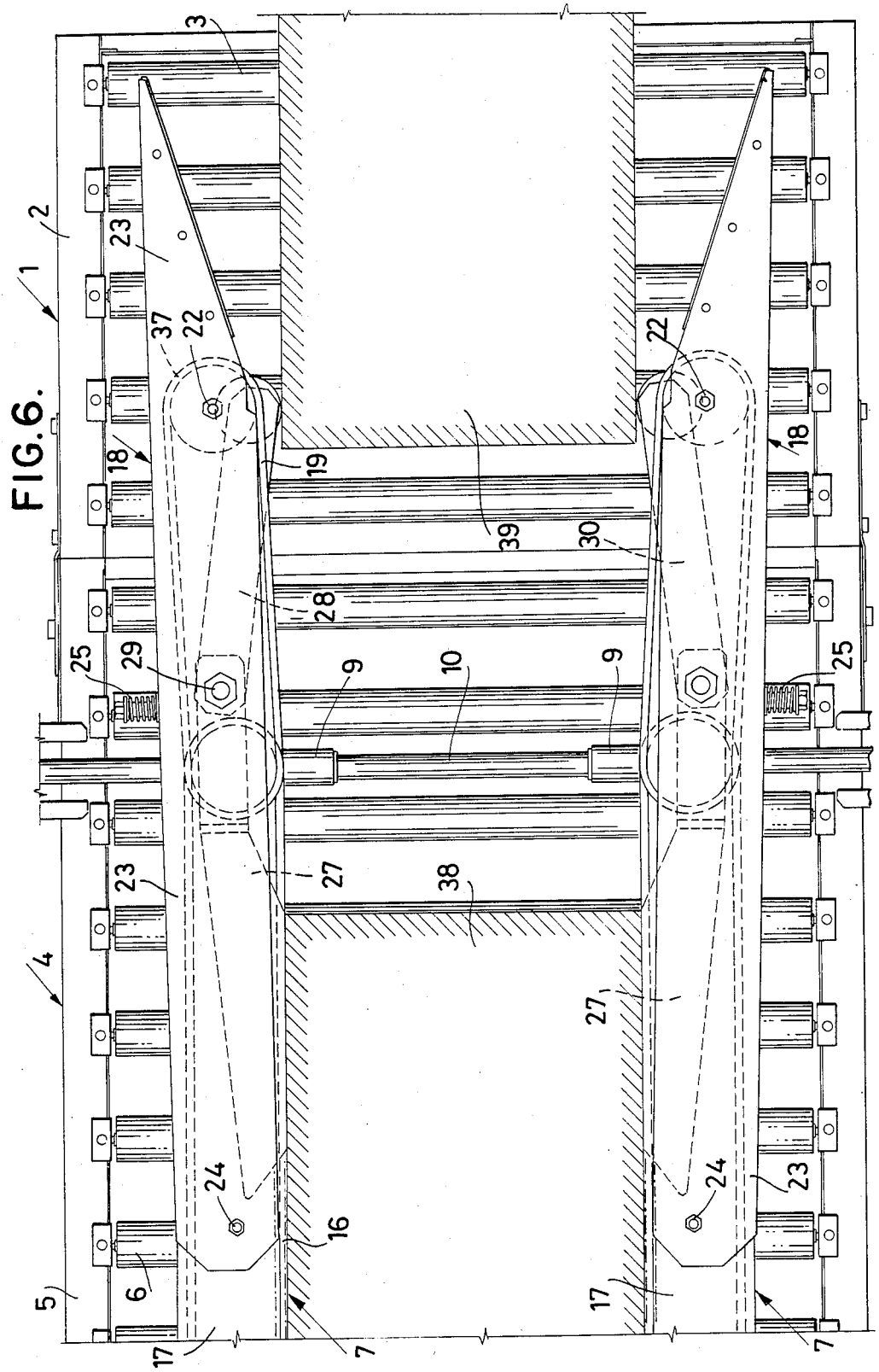

If the second box has already reached the belts 19 rotation of the levers 28 is permitted only until engagement of the rollers 34 with the sides of the box. Completion of the reentry movement of the lever portions 27 causes by lateral thrust through the pin 29 and against the springs 25 rotation of the hood 23 and hence of the entirety of the extensions 18 around the pins 24 with the resulting spreading of said extensions 18 in relation to the main entrainment units 7. As a result the belts 19 withdraw from the sides of the second box 39 which remains stationary being stopped by the idling rollers 34. This situation is shown in FIG. 6.

Figure 7:
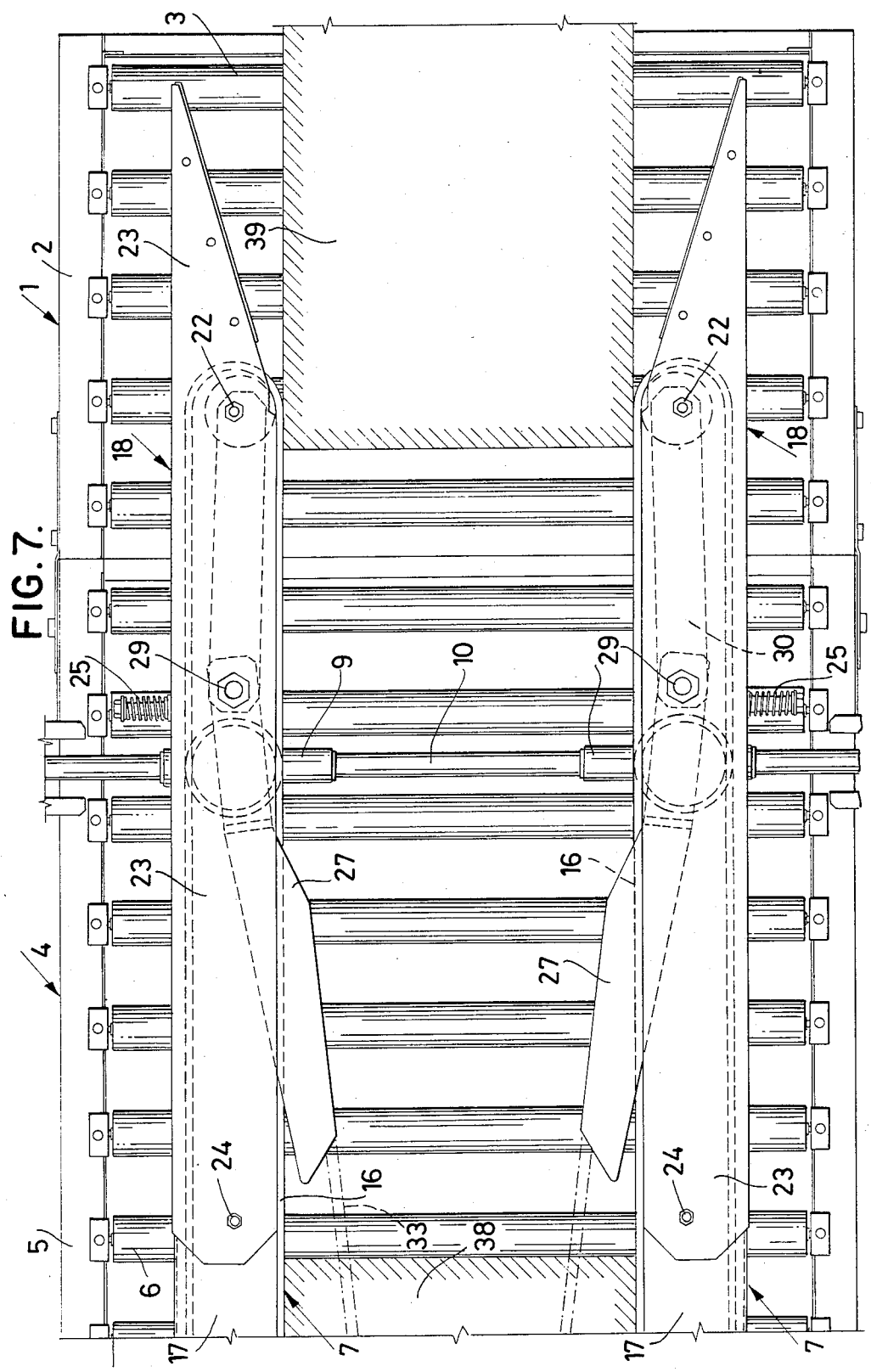

Once the first box 38 has left the lever portions 27 the levers 28 are brought back by the springs 35 to the initial position shown in FIG. 1 and under the thrust of the springs 25 and the extensions 18 can in turn realign themselves with the entrainment units 7 allowing the belts 19 to engage the sides of the second box 39 (FIG. 7). The second box can thus proceed along the supporting surfaces 1 and 4 to then engage the lever portions 27 and thus cause appropriate spacing of the following box.

It should be noted that the case may arise in which a very long box engages the first portion 27 of the levers 28 before its rear part has passed the rollers 34. In this case the extensions 18 and the levers 28 arrange themselves as in FIG. 6 but with the rollers 34 engaged with the sides of the box. Said box may however travel freely entrained by the belts 16 given the idling nature of the rollers 34. Having left said rollers 34 one or the other of the situations illustrated in FIGS. 5 and 6 comes in to effect in relation to the following box.

I claim:

1. Device for spacing of objects conveyed through an operating machine, in particular for cardboard box closing and/or sealing machines, said device comprising means sensitive to the passage of a first object and at least one retaining member placed upstream from said sensitive means in the direction of travel of the objects and caused by said sensitive means to move tranversely to said direction of travel to achieve a retaining engagement with a second object until achievement of a desired distance from the first object characterized in that said sensitive means comprises a belt entrainment unit having a spreading section, a lever having a first portion pivoted on the spreading section engaging with the sides of the objects conveyed to cause travel through the machine and said retaining member comprises a passive stopping means mounted on a second portion of said lever so as to be moved toward the interior of the machine when said first portion is moved outward by the passage of a first object and vice versa, there being provided first elastic means acting on said spreading section of said entrainment unit to stress it in a yielding manner toward a condition of alignment with the remaining part of said unit and second elastic means acting on said lever to stress it in a yielding manner into a waiting position in which said first portion is moved toward the interior of the machine and said second portion is moved toward the outside of said machine.

2. Device in accordance with claim 1 characterized in that said first portion is fitted with seats for housing extension bars.

3. Device in accordance with claim 1 characterized in that said stopping means includes a rubber roller.

4. Device in accordance with claim 1 characterized in that said stopping means includes a fixed shoe.

5. Device in accordance with claim 1 characterized in that said lever portions are inclined toward each other.

6. Device in accordance with claim 1 characterized in that said lever portions are located in different horizontal planes and connected rigidly together by a sleeve rotatably mounted on a pin which constitutes the rotating pivot of the lever.

7. Device in accordance with claim 1 including a spreading section for each entrainment unit and a lever with a first and a second portion for each spreading section.

* * * * *